United States Patent
Zhang et al.

(10) Patent No.: US 11,115,153 B2
(45) Date of Patent: Sep. 7, 2021

(54) METHOD FOR TRANSMITTING DATA IN FLEXIBLE ETHERNET AND DEVICE

(71) Applicant: Huawei Technologies Co., Ltd., Shenzhen (CN)

(72) Inventors: Ke Zhang, Dongguan (CN); Wei Xue, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/543,084

(22) Filed: Aug. 16, 2019

(65) Prior Publication Data
US 2019/0372717 A1    Dec. 5, 2019

Related U.S. Application Data (63) Continuation of application No. PCT/CN2018/074804, filed on Jan. 31, 2018.

(30) Foreign Application Priority Data

Feb. 16, 2017    (CN) .......................... 201710084715.3

(51) Int. Cl.
*H04L 1/00* (2006.01)
*H04L 29/06* (2006.01)

(52) U.S. Cl.
CPC .......... *H04L 1/0083* (2013.01); *H04L 1/0061* (2013.01); *H04L 69/10* (2013.01); *H04L 69/14* (2013.01)

(58) Field of Classification Search
CPC ..... H04L 1/0083; H04L 43/16; H04L 1/0061; H04L 43/0847; H04L 1/1614;
(Continued)

(56) References Cited

U.S. PATENT DOCUMENTS 9,838,290 B2 * 12/2017 Gareau ................. H04J 3/1658
10,135,760 B2 * 11/2018 Gareau .................... H04L 49/45
(Continued)

FOREIGN PATENT DOCUMENTS

| CN | 104219777 A | 12/2014 |
|---|---|---|
| CN | 106341207 A | 1/2017 |

(Continued)

OTHER PUBLICATIONS

"OIF-Flexe-01.0 Flex Ethernet Implementation Agreement," OIF-Optical Internetworking Forum, Mar. 31, 2016, XP055623494, 31 pages.
(Continued)

*Primary Examiner* — Man U Phan
(74) *Attorney, Agent, or Firm* — Conley Rose, P.C.

(57) ABSTRACT

A method for transmitting data in flexible Ethernet (FlexE) and a device comprising transmitting data in FlexE whereby a first FlexE device receives, according to a first client calendar, data from a second FlexE device; the first FlexE device determines, based on an error data block in the data, that a first timeslot is damaged; the first FlexE device adds a timeslot damage notification to an overhead frame to be sent to the second FlexE device; the first FlexE device receives a second client calendar from the second FlexE device; and the first FlexE device receives, using the second client calendar, the data from the second FlexE device.

20 Claims, 4 Drawing Sheets

(58) Field of Classification Search
CPC ....... H04L 69/10; H04L 69/14; H04L 1/0078; H04L 1/00; H04L 29/06; H04J 2203/0085; H04J 3/1658
USPC .......................................................... 370/225
See application file for complete search history.

(56) References Cited

U.S. PATENT DOCUMENTS

| | | | |
|---|---|---|---|
| 10,218,823 B2 * | 2/2019 | Gareau | H04L 69/28 |
| 10,382,167 B2 * | 8/2019 | Gareau | H04L 49/351 |
| 10,397,088 B2 * | 8/2019 | Gareau | H04L 43/0811 |
| 10,425,177 B2 * | 9/2019 | Gareau | H04J 3/1658 |
| 10,623,327 B2 * | 4/2020 | Wu | H04L 1/0008 |
| 10,673,782 B2 * | 6/2020 | Gareau | H04L 49/35 |
| 2013/0139018 A1 | 5/2013 | Takada et al. | |
| 2016/0028586 A1 | 1/2016 | Blair | |
| 2017/0005901 A1 | 1/2017 | Gareau | |
| 2017/0324472 A1 | 11/2017 | Kitamura et al. | |
| 2017/0324496 A1 | 11/2017 | Yamada et al. | |
| 2018/0123714 A1 | 5/2018 | Zhong et al. | |
| 2018/0145928 A1 | 5/2018 | Zhong et al. | |
| 2018/0159785 A1 | 6/2018 | Wu et al. | |
| 2019/0229846 A1 * | 7/2019 | Liu | H04B 17/30 |
| 2019/0349282 A1 * | 11/2019 | Gareau | H04L 43/0811 |
| 2020/0007255 A1 * | 1/2020 | Gareau | H04J 3/1658 |
| 2020/0007256 A1 * | 1/2020 | Liu | H04B 17/30 |

FOREIGN PATENT DOCUMENTS

| | | |
|---|---|---|
| CN | 106357421 A | 1/2017 |
| CN | 106411454 A | 2/2017 |
| CN | 106911426 A | 6/2017 |
| EP | 3113502 A1 | 1/2017 |
| WO | 2016084893 A1 | 6/2016 |
| WO | 2016084953 A1 | 6/2016 |
| WO | 2017016379 A1 | 2/2017 |

OTHER PUBLICATIONS

Foreign Communication From A Counterpart Application, European Application No. 18754797.1, Extended European Search Report dated Dec. 19, 2019, 9 pages.

Machine Translation and Abstract of Chinese Publication No. CN104219777, Dec. 17, 2014, 14 pages.

Machine Translation and Abstract of Chinese Publication No. CN106911426, Jun. 30, 2017, 20 pages.

Foreign Communication From A Counterpart Application, Chinese Application No. 201710084715.3, Chinese Office Action dated May 8, 2019, 8 pages.

Foreign Communication From A Counterpart Application, PCT Application No. PCT/CN2018/074804, English Translation of International Search Report dated Apr. 17, 2018, 3 pages.

Foreign Communication From A Counterpart Application, PCT Application No. PCT/CN2018/074804, English Translation of Written Opinion dated Apr. 17, 2018, 5 pages.

* cited by examiner

METHOD FOR TRANSMITTING DATA IN FLEXIBLE ETHERNET AND DEVICE

CROSS-REFERENCE TO RELATED APPLICATIONS

This application is a continuation application of International Application No. PCT/CN2018/074804, filed on Jan. 31, 2018, which claims priority to Chinese Patent Application No. 201710084715.3, filed on Feb. 16, 2017. The disclosures of the aforementioned applications are hereby incorporated by reference in their entireties.

TECHNICAL FIELD

This application relates to the communications field, and in particular, to a method for transmitting data in flexible Ethernet (FlexE) and a device.

BACKGROUND

A shim layer is defined between a Media Access Control (MAC) layer and a physical layer in a FlexE implementation agreement issued by the Optical Internetworking Forum (OIF). During FlexE-based forwarding, a transmit-end FlexE device uses a timeslot corresponding to a FlexE client to send a packet of the FlexE client to a receive-end FlexE device. The FlexE client is an Ethernet stream based on a MAC data rate. The MAC data rate may be equal or not equal to an Ethernet physical layer rate. The receive-end FlexE device obtains, in the timeslot corresponding to the FlexE client, data sent by the transmit-end FlexE device to restore the packet.

When hardware used by the transmit-end FlexE device for sending the packet is partially damaged, for example, the FlexE device includes a plurality of parallel processing components corresponding to a plurality of timeslots, and one of the plurality of parallel processing components is damaged, an error occurs in a packet that is sent by the transmit-end FlexE device in a timeslot corresponding to the damaged processing component. If errors keep occurring in a packet in a timeslot, the timeslot may be considered as damaged. After restoring the packet, the receive-end FlexE device may find the error packet through error checking and discard the packet, or perform error correction on the packet. However, the transmit-end FlexE device cannot detect whether the timeslot is damaged, and continues to use the damaged timeslot to send a packet, affecting packet transmission.

SUMMARY

This application provides a method for transmitting data in FlexE and a device, to help reduce impact of timeslot damage during data transmission in the FlexE.

According to a first aspect, a method for transmitting data in FlexE is provided, and the method includes: receiving, by a first FlexE device according to a first client calendar, data that includes a plurality of data blocks and that is sent by a second FlexE device, where the first client calendar indicates a correspondence between a client and a first timeslot set; determining, by the first FlexE device based on an error data block in the plurality of data blocks, that a first timeslot is damaged, where the first timeslot set includes the first timeslot; adding, by the first FlexE device, a timeslot damage notification to an overhead frame to be sent to the second FlexE device, where the timeslot damage notification indicates that the first timeslot is damaged; receiving, by the first FlexE device, a second client calendar sent by the second FlexE device, where the second client calendar indicates a correspondence between the client and a second timeslot set, and the second timeslot set includes a timeslot, other than the first timeslot, in the first timeslot set; and receiving, by the first FlexE device using the second client calendar, data sent by the second FlexE device.

According to the foregoing solution, a receive-end FlexE device may notify a timeslot damage status to a transmit-end FlexE device such that the transmit-end FlexE device can adjust a transmission timeslot in a timely manner, thereby reducing impact of timeslot damage on data transmission.

Optionally, the second timeslot set further includes an alternative timeslot that is not in the first timeslot set. Replacing a damaged timeslot with the alternative timeslot helps provide sufficient transmission timeslots, thereby further reducing the impact of the timeslot damage on the data transmission.

Optionally, the determining, by the first FlexE device based on an error data block, that a first timeslot is damaged includes: if a quantity of error data blocks corresponding to the first timeslot meets a condition, determining, by the first FlexE device, that the first timeslot is damaged. Setting a condition for determining timeslot damage can filter out an occasional transmission error and improve applicability of the data transmission method.

According to a second aspect, a method for transmitting data in FlexE is provided, and the method includes: sending, by a first FlexE device according to a first client calendar, data that includes a plurality of data blocks to a second FlexE device, where the first client calendar indicates a correspondence between a client and a first timeslot set; receiving, by the first FlexE device, a timeslot damage notification in an overhead frame sent by the second FlexE device, where the timeslot damage notification indicates that a first timeslot in the first timeslot set is damaged; sending, by the first FlexE device, a second client calendar to the second FlexE device, where the second client calendar indicates a correspondence between the client and a second timeslot set, and the second timeslot set includes a timeslot, other than the first timeslot, in the first timeslot set; and sending, by the first FlexE device, data to the second FlexE device using the second client calendar.

Optionally, the second timeslot set further includes an alternative timeslot that is not in the first timeslot set.

The solution of the second aspect has a same technical effect as a corresponding solution using a same means in content described in the first aspect.

According to a third aspect, a FlexE device that includes a media access controller, a FlexE shim circuit, and a physical layer transceiver is provided, where the FlexE shim circuit is configured to receive, using the physical layer transceiver according to a first client calendar, data that includes a plurality of data blocks and that is sent by another FlexE device, determine, based on an error data block in the plurality of data blocks that is determined by the media access controller, that a first timeslot is damaged, and send, using the physical layer transceiver, an overhead frame that includes a timeslot damage notification to the other FlexE device, where the first client calendar indicates a correspondence between a client and a first timeslot set, the first timeslot set includes the first timeslot, and the timeslot damage notification indicates that the first timeslot is damaged; and the FlexE shim circuit is further configured to receive, using the physical layer transceiver, a second client calendar sent by the other FlexE device, and receive, using the second client calendar and using the physical layer transceiver, data sent by the other FlexE device, where the second client calendar indicates a correspondence between the client and a second timeslot set, and the second timeslot set includes a timeslot, other than the first timeslot, in the first timeslot set.

Optionally, the second timeslot set further includes an alternative timeslot that is not in the first timeslot set.

Optionally, that the FlexE shim circuit determines, based on an error data block in the plurality of data blocks that is determined by the media access controller, that a first timeslot is damaged includes: if a quantity of error data blocks corresponding to the first timeslot meets a condition, determining, by the FlexE shim circuit, that the first timeslot is damaged.

The solution of the third aspect has a same technical effect as a corresponding solution using a same means in content described in the first aspect.

According to a fourth aspect, a FlexE device that includes a FlexE shim circuit and a physical layer transceiver is provided, where the FlexE shim circuit is configured to send, using the physical layer transceiver according to a first client calendar, data that includes a plurality of data blocks to another FlexE device, where the first client calendar indicates a correspondence between a client and a first timeslot set; the FlexE shim circuit is further configured to receive, using the physical layer transceiver, a timeslot damage notification in an overhead frame sent by the other FlexE device, where the timeslot damage notification indicates that a first timeslot in the first timeslot set is damaged; the FlexE shim circuit is further configured to send a second client calendar to the other FlexE device using the physical layer transceiver, where the second client calendar indicates a correspondence between the client and a second timeslot set, and the second timeslot set includes a timeslot, other than the first timeslot, in the first timeslot set; and the FlexE shim circuit is further configured to send data to the other FlexE device using the second client calendar and using the physical layer transceiver.

Optionally, the second timeslot set further includes an alternative timeslot that is not in the first timeslot set. The solution of the fourth aspect has a same technical effect as a corresponding solution using a same means in content described in the first aspect.

According to a fifth aspect, a FlexE device that includes a receiving unit, a determining unit, and a sending unit is provided, where the receiving unit is configured to receive according to a first client calendar, data that includes a plurality of data blocks and that is sent by another FlexE device, where the first client calendar indicates a correspondence between a client and a first timeslot set; the determining unit is configured to determine, based on an error data block in the plurality of data blocks, that a first timeslot is damaged, where the first timeslot set includes the first timeslot; the sending unit is configured to add a timeslot damage notification to an overhead frame to be sent to the other FlexE device, where the timeslot damage notification indicates that the first timeslot is damaged; and the receiving unit is further configured to receive a second client calendar sent by the other FlexE device, where the second client calendar indicates a correspondence between the client and a second timeslot set, and the second timeslot set includes a timeslot, other than the first timeslot, in the first timeslot set; and receive, using the second client calendar, data sent by the other FlexE device.

Optionally, the second timeslot set further includes an alternative timeslot that is not in the first timeslot set.

Optionally, that the determining unit determines, based on an error data block, that a first timeslot is damaged includes: if a quantity of error data blocks corresponding to the first timeslot meets a condition, the determining unit determines that the first timeslot is damaged.

The solution of the fifth aspect has a same technical effect as a corresponding solution using a same means in content described in the first aspect.

According to a sixth aspect, a FlexE device that includes a sending unit and a receiving unit is provided, where the sending unit is configured to send according to a first client calendar, data that includes a plurality of data blocks to another FlexE device, where the first client calendar indicates a correspondence between a client and a first timeslot set; the receiving unit is configured to receive a timeslot damage notification in an overhead frame sent by the other FlexE device, where the timeslot damage notification indicates that a first timeslot in the first timeslot set is damaged; and the sending unit is further configured to send a second client calendar to the other FlexE device, where the second client calendar indicates a correspondence between the client and a second timeslot set, and the second timeslot set includes a timeslot, other than the first timeslot, in the first timeslot set; and send data to the other FlexE device using the second client calendar.

Optionally, the second timeslot set further includes an alternative timeslot that is not in the first timeslot set.

The solution of the sixth aspect has a same technical effect as a corresponding solution using a same means in content described in the first aspect.

DESCRIPTION OF EMBODIMENTS

To make the objectives, technical solutions, and advantages of the present application clearer, the following further describes the embodiments of the present application in detail with reference to the accompanying drawings.

An application scenario described in the embodiments of this application is intended to more clearly describe the technical solutions of the embodiments of this application, and does not constitute a limitation on the technical solutions provided in the embodiments of this application. A person of ordinary skill in the art may learn that the technical solutions provided in the embodiments of this application are also applicable to a similar technical problem as a network architecture evolves and a new application scenario emerges.

Data transmission in FlexE is based on a time division multiplexing mechanism. Time domain resources of a physical layer transceiver with a transmission rate of 100 gigabits per second (Gbit/s) may be divided into 20 timeslots, and data is sent and received using the 20 timeslots as a period. In each of the 20 timeslots, the physical layer transceiver sends and receives data at a rate of 5 Gbit/s. In each period, a FlexE device may send a data block in a timeslot using the physical layer transceiver, or may receive a data block in a timeslot using the physical layer transceiver. One FlexE client corresponds to one or more timeslots. The 20 timeslots in the time domain resources of the physical layer transceiver may correspond to one or more FlexE clients. In other words, the 20 timeslots in the time domain resources of the physical layer transceiver may be used to send or receive data of only one FlexE client, or may be used to send or receive data of a plurality of FlexE clients. A correspondence between a FlexE client and a timeslot is referred to as a client calendar. A transmit-end FlexE device A sends, in a timeslot corresponding to a FlexE client, a data block of the FlexE client to a receive-end FlexE device B using a client calendar.

Figure 1:
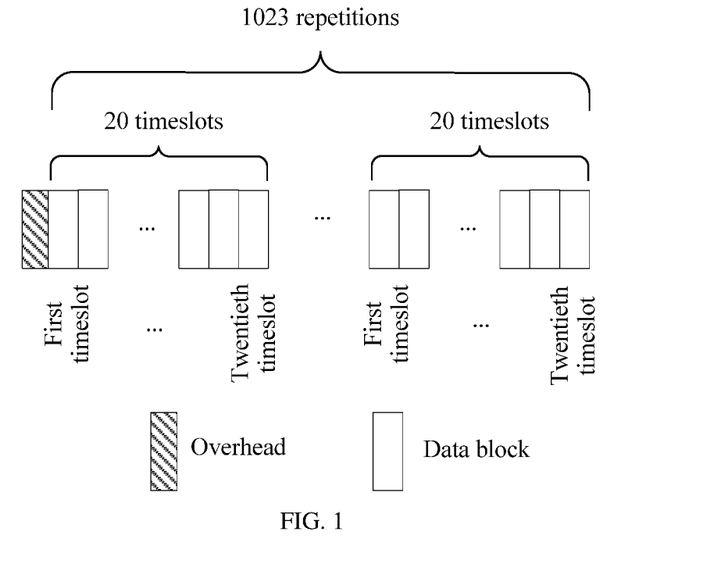
FIG. 1 is a schematic diagram of data that is transferred by a FlexE device using a physical layer transceiver.

FIG. 1 is a schematic diagram of data that is transferred by a FlexE device using a physical layer transceiver.

The data that is transferred by the FlexE device using the physical layer transceiver includes a data block and an overhead. In this application, "x" is a multiplication sign. As shown in FIG. 1, there is one overhead in the front of every 20×1023 consecutive data blocks. There is no other data block or overhead between the overhead and the 20×1023 consecutive data blocks. After sending 8×32 the 20×1023 consecutive data blocks, a FlexE device A sends 8×32 overheads in total. Every eight overheads form one FlexE overhead frame. 32 FlexE overhead frames form one FlexE overhead multiframe. The first 20 FlexE overhead frames of the FlexE overhead multiframe each include two FlexE client indication fields corresponding to one timeslot. For example, a first FlexE overhead frame includes two FlexE client indication fields corresponding to a first timeslot, for example, a client bearer calendar A of the first timeslot and a client bearer calendar B of the first timeslot. A second FlexE overhead frame includes two FlexE client indication fields corresponding to a second timeslot, for example, a client bearer calendar A of the second timeslot and a client bearer calendar B of the second timeslot. The rest can be deduced by analogy. Before a FlexE overhead multiframe is completely sent, client calendars agreed upon by the FlexE device A and a FlexE device B do not change. The FlexE device combines client bearer calendars A from the client bearer calendar A of the first timeslot to a client bearer calendar A of a twentieth timeslot to obtain a client calendar A. The FlexE device combines client bearer calendars B from the client bearer calendar B of the first timeslot to a client bearer calendar B of a twentieth timeslot to obtain a client calendar B. The receive-end FlexE device B may combine data blocks from a same FlexE client based on the client calendar A or the client calendar B to restore an original packet of the FlexE client. The FlexE overhead multiframe may further include another field. For specific content of each field in the FlexE overhead multiframe, refer to a description in the Flex Ethernet Implementation Agreement 1.0.

Each of the foregoing 20×1023 data blocks may be a 64-bit/66-bit (64b/66b) line-encoded data block. The data block in this application is an encoded data block. For example, the data block may be a data block encoded using a physical coding sublayer (PCS) circuit.

Each of eight overheads forming one FlexE overhead frame is a 66-bit block. As described in the flexible Ethernet implementation agreement 1.0, the eight overheads include a reserved bit that can be used, for example, twentieth to sixty-sixth bits of a second overhead and thirty-eighth to fiftieth bits of a third overhead.

A timeslot damage notification is transferred using a reserved bit in the FlexE overhead frame in this embodiment of this application. A receive-end FlexE device may determine a damaged timeslot based on a case in which a received data block includes an error data block, and send the timeslot damage notification to a transmit-end FlexE device in an opposite direction of a same cable for receiving the data block. The cable includes, for example, a pair of lines for transmitting data in two opposite directions. In this way, the damaged timeslot indicated by the timeslot damage notification sent by the receive-end FlexE device corresponds to a damaged timeslot of the transmit-end FlexE device. The transmit-end FlexE device may adjust, based on the timeslot damage notification, a timeslot used for sending data. The reserved bit uses, for example, the thirty-eighth bit of the third overhead. A value of 0 indicates that a timeslot is in a normal state, and a value of 1 indicates that the timeslot is in a damaged state.

Figure 2:
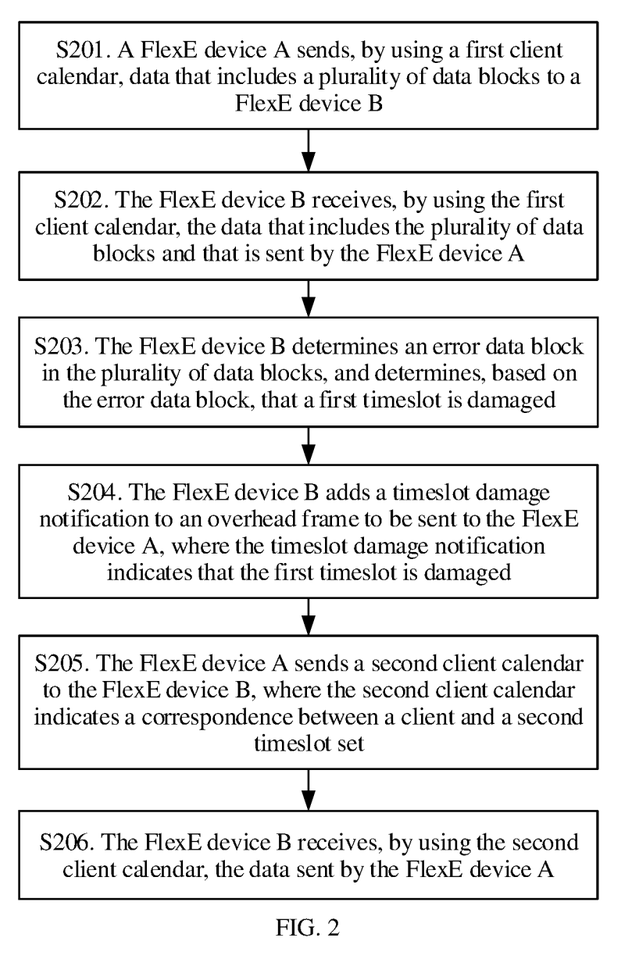
FIG. 2 is a schematic flowchart of a method for transmitting data in FlexE according to an embodiment of this application.

FIG. 2 is a schematic flowchart of a method for transmitting data in FlexE according to an embodiment of this application. A procedure of the method is shown as follows:

S201. A FlexE device A sends according to a first client calendar, data that includes a plurality of data blocks to a FlexE device B.

The first client calendar indicates a correspondence between a client and a first timeslot set. The first timeslot set may include a plurality of timeslots. The first client calendar is, for example, a client calendar A, and the client calendar A indicates a correspondence between one or more clients and the first timeslot set. The first timeslot set includes one or more timeslots. For example, the first timeslot set includes a first timeslot, a second timeslot, and a fifth timeslot. The client calendar A indicates that a FlexE client 1 corresponds to the first timeslot and the second timeslot in the first timeslot set, and a FlexE client 2 corresponds to the fifth timeslot in the first timeslot set. The FlexE device A periodically sends data to the FlexE device B based on the client calendar A in a plurality of timeslots in the first timeslot set. Within each sending period, one data block can be sent in each of the plurality of timeslots.

S202. The FlexE device B receives, using the first client calendar, the data that includes the plurality of data blocks and that is sent by the FlexE device A.

The FlexE device B obtains, from the data sent by the FlexE device A, the plurality of data blocks from a FlexE client based on an indication of the first client calendar. The FlexE device B receives, in one or more timeslots corresponding to one FlexE client that are included in the first timeslot set, a plurality of data blocks corresponding to the FlexE client. The FlexE device B receives, in one or more timeslots corresponding to another FlexE client that are included in the first timeslot set, a plurality of data blocks corresponding to the other FlexE client. The FlexE device B combines data blocks from a same FlexE client to restore an original packet from each FlexE client.

S203. The FlexE device B determines, based on an error data block in the plurality of data blocks, that a first timeslot is damaged.

The FlexE device B performs error checking on an original packet restored from the plurality of data blocks. The checking is, for example, a cyclic redundancy check (CRC). An error packet in the original packet can be determined through the error checking. A data block included in the error packet is an error data block. In this way, the error data block in the plurality of data blocks can be determined. The error data block may be received in a plurality of timeslots within one receiving period, or may be received in one or more timeslots within a plurality of receiving periods. The one or more timeslots in which the error data block is received are damaged timeslots. A damaged timeslot, for example, the first timeslot, in the first timeslot set may be determined based on the error data block in the plurality of data blocks. The first timeslot may include one or more timeslots.

Optionally, if a quantity of error data blocks corresponding to the first timeslot meets a condition, the FlexE device B determines that the first timeslot is damaged. For example, the FlexE device B determines timeslots corresponding to all error data blocks in the plurality of data blocks, counts a quantity of error data blocks corresponding to each timeslot, and when a quantity of error data blocks corresponding to a timeslot exceeds a threshold, determines that the timeslot is damaged, or when a quantity of error data blocks corresponding to a timeslot within a unit time exceeds a threshold, determines that the timeslot is damaged, or when a ratio of a quantity of error data blocks corresponding to a timeslot within a unit time to a total quantity of data blocks corresponding to the timeslot within a unit time exceeds a threshold, determines that the timeslot is damaged. The first timeslot includes all timeslots that are determined as damaged timeslots. Setting a condition for determining timeslot damage can filter out an occasional transmission error, avoid incorrect deletion or replacement of an undamaged timeslot, and further improve applicability of the data transmission method.

S204. The FlexE device B adds a timeslot damage notification to an overhead frame to be sent to the FlexE device A, where the timeslot damage notification indicates that the first timeslot is damaged.

Each overhead frame sent by the FlexE device B to the FlexE device A includes eight overheads, from which a reserved bit may be selected as a timeslot damage notification to indicate a damaged timeslot. For example, a total of 20 bits, namely, twentieth to thirty-ninth bits of a second overhead are selected. A value of 0 indicates that a timeslot is normal, a value of 1 indicates that the timeslot is damaged, and values of the 20 bits may sequentially indicate damage statuses of 20 timeslots. For another example, the FlexE device B sequentially adds timeslot damage notifications to a plurality of overhead frames to be sent to the FlexE device A. The plurality of overhead frames may be the first 20 overhead frames in an overhead multiframe sent by the FlexE device B to the FlexE device A. Each of the first 20 overhead frames sent by the FlexE device B to the FlexE device A corresponds to a timeslot in which the FlexE device A sends data to the FlexE device B. If a timeslot in which the FlexE device A sends data to the FlexE device B is damaged, the FlexE device B adds a timeslot damage notification to a corresponding overhead frame sent by the FlexE device B to the FlexE device A. For example, the timeslot damage notification occupies a thirty-eighth bit of a third overhead in each overhead frame, a value of 0 indicates that a timeslot is normal, and a value of 1 indicates that the timeslot is damaged. In this way, the timeslot damage notifications in the 20 overhead frames sequentially sent by the FlexE device B to the FlexE device A may sequentially indicate damage statuses of first to twentieth timeslots.

S205. The FlexE device A sends a second client calendar to the FlexE device B, where the second client calendar indicates a correspondence between the client and a second timeslot set.

The second timeslot set does not include the first timeslot. The second timeslot set may include any timeslot, other than the first timeslot, in the first timeslot set. The second timeslot set may further include a timeslot (for example, an alternative timeslot or a newly added timeslot) that is not in the first timeslot set.

The FlexE device A deletes the relationship between the client and the first timeslot from the first client calendar based on the timeslot damage notification in the overhead frame sent by the FlexE device B, to generate the second client calendar. The deletion is, for example, deleting a client bearer calendar corresponding to the first timeslot from the first client calendar or setting a client bearer calendar to another value that does not indicate any client. When the first client calendar is the client calendar A, the second client calendar is a client calendar B. In this way, the second client calendar generated by the FlexE device B may indicate the correspondence between the client and the second timeslot set. The second timeslot set includes a timeslot, other than the first timeslot, in the first timeslot set.

Optionally, the second timeslot set further includes an alternative timeslot, and the alternative timeslot is not in the first timeslot set. The FlexE device A may search for an alternative timeslot for replacing the first timeslot, and the alternative timeslot is not in the first timeslot set. The FlexE device A adds, to the second client calendar, a client bearer calendar that indicates the client and that corresponds to the alternative timeslot. In this way, the second client calendar may indicate the correspondence between the client and the second timeslot set, and the second timeslot set includes the alternative timeslot that is not in the first timeslot set. The alternative timeslot may be a timeslot that is in the first client calendar and that does not include the client bearer calendar or a timeslot that is of the client bearer calendar and that does not indicate any client. The FlexE device A may record a damaged timeslot in order to exclude the recorded damaged timeslot when this method is subsequently performed again to search for the alternative timeslot. Replacing the damaged timeslot with the alternative timeslot helps provide sufficient transmission timeslots, thereby further reducing impact of timeslot damage on data transmission, and ensuring a sufficient transmission rate.

After preparing the second client calendar, the FlexE device A sends a calendar request (CR) to the FlexE device B, for example, sets a value of a calendar request bit in the overhead frame to be sent to the FlexE device B. A thirty-sixth bit of a third overhead in the overhead frame is a CR bit. When a value of a CR bit in a previously sent overhead frame is 0, the FlexE device A changes to continuously sending a FlexE overhead frame having a CR bit with a value of 1. Alternatively, when a value of a CR bit in a previously sent FlexE overhead frame is 1, the FlexE device A changes to continuously sending a FlexE overhead frame having a CR bit with a value of 0.

The FlexE device B identifies, based on the value of the calendar request bit, the calendar request sent by the FlexE device A, and sends a calendar acknowledgement (CA) to the FlexE device A, for example, sets a value of a calendar acknowledgement bit in the overhead frame to be sent to the FlexE device A. A thirty-seventh bit of a third overhead in the overhead frame is a CA bit. A CA value set by the FlexE device B is the same as a CR value set by the FlexE device A. In this way, the FlexE device A identifies the calendar acknowledgement that is sent by the FlexE device B for the calendar request.

S206. The FlexE device B receives, using the second client calendar, the data sent by the FlexE device A.

After receiving the calendar acknowledgement and sending the second client calendar, the FlexE device A starts to send, using the second client calendar, data that includes a plurality of data blocks to the FlexE device B. When the first client calendar is the client calendar A, the second client calendar is the client calendar B. When the first client calendar is the client calendar B, the second client calendar is the client calendar A. The second client calendar indicates the correspondence between the FlexE client and the second timeslot set. The FlexE device A sends, based on the second client calendar in a plurality of timeslots in the second timeslot set, the data that includes the plurality of data blocks to the FlexE device B. The FlexE device A periodically sends data to the FlexE device B based on the second client calendar in the plurality of timeslots in the second timeslot set. Within each sending period, one data block can be sent in each of the plurality of timeslots. The FlexE device B obtains, from the data sent by the FlexE device A, the plurality of data blocks from the FlexE client. The FlexE device B receives, in one or more timeslots corresponding to one FlexE client that are included in the second timeslot set, a plurality of data blocks corresponding to the FlexE client. The FlexE device B receives, in one or more timeslots corresponding to another FlexE client that are included in the second timeslot set, a plurality of data blocks corresponding to the other FlexE client. The FlexE device B combines data blocks from a same FlexE client to restore an original packet from each FlexE client.

The FlexE device A may set values of three C bits in the FlexE overhead frame to notify the FlexE device B whether data that is being sent uses the client calendar A or the client calendar B. The foregoing three C bits are respectively located in an eleventh bit of a first overhead, a third bit of a second overhead, and a third bit of the third overhead in the overhead frame. The FlexE device A sets same values of the three C bits when sending the overhead frame. After receiving the overhead frame, the FlexE device B determines a value of a C bit based on the values of the three C bits using a majority vote. When a client calendar used by the FlexE device A switches between the client calendar A and the client calendar B, the FlexE device A changes the values of the three C bits, for example, from 0 to 1, or from 1 to 0.

According to the foregoing method shown in FIG. 2, a receive-end FlexE device may notify a timeslot damage status to a transmit-end FlexE device such that the transmit-end FlexE device can adjust a transmission timeslot in a timely manner, and delete a damaged timeslot, thereby reducing impact on data transmission.

Figure 3:
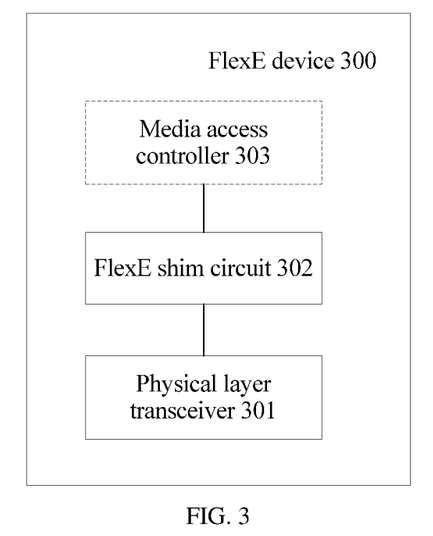
FIG. 3 is a structural diagram of a FlexE device 300 according to an embodiment of this application.

FIG. 3 is a structural diagram of a FlexE device 300 according to an embodiment of this application. The FlexE device 300 is a network device having a FlexE shim layer processing function, and may include a physical layer transceiver 301, a FlexE shim circuit 302, and a media access controller 303. The FlexE device 300 may be used as the FlexE device B or the FlexE device A in the method shown in FIG. 2. The FlexE device 300 may implement a function of the FlexE device B using the physical layer transceiver 301, the FlexE shim circuit 302, and the media access controller 303. The FlexE device 300 may implement a function of the FlexE device A using the physical layer transceiver 301 and the FlexE shim circuit 302.

When the FlexE device 300 is used as the FlexE device B in the method shown in FIG. 2, an internal implementation of the FlexE device 300 is as follows:

The FlexE shim circuit 302 receives according to a first client calendar using the physical layer transceiver 301, data that includes a plurality of data blocks and that is sent by the FlexE device A, and combines data blocks from a same FlexE client to restore an original packet from each client. The first client calendar indicates a correspondence between a client and a first timeslot set. The media access controller 303 performs error checking on the original packet, to determine an error packet in the original packet. A data block included in the error packet is an error data block. The FlexE shim circuit 302 determines a damaged timeslot in the first timeslot set based on the error data block. The method for receiving the data using the first client calendar, performing error checking, and determining the damaged timeslot is the same as step S202 and step S203 shown in FIG. 2.

The FlexE shim circuit 302 adds a timeslot damage notification to an overhead frame to be sent to the FlexE device A. The timeslot damage notification may indicate the damaged timeslot in the first timeslot set. The method for adding the timeslot damage notification is the same as step S204 shown in FIG. 2. The FlexE shim circuit 302 sends, using the physical layer transceiver 301, the overhead frame that includes the timeslot damage notification to the FlexE device A.

The FlexE shim circuit 302 receives, using the physical layer transceiver 301, a second client calendar sent by the FlexE device A, and receives, using the second client calendar and using the physical layer transceiver 301, the data sent by the FlexE device A. The second client calendar indicates a correspondence between the client and a second timeslot set. The second timeslot set includes a timeslot, other than the damaged timeslot, in the first timeslot set. After receiving, using the physical layer transceiver 301, a calendar request and the second client calendar that are sent by the FlexE device A, and being prepared to receive, using the second client calendar, the data sent by the FlexE device A, the FlexE shim circuit 302 may set a value of a calendar acknowledgement bit in the overhead frame sent to the FlexE device A, to return a calendar acknowledgement to the FlexE device A. The receiving the second client calendar and the receiving, using the second client calendar, the data sent by the FlexE device A are the same as step S205 and step S206 shown in FIG. 2.

The second timeslot set does not include the damaged timeslot in the first timeslot set. Optionally, the second timeslot set may include any timeslot, other than the damaged timeslot, in the first timeslot set. The second timeslot set may further include a timeslot (for example, an alternative timeslot or a newly added timeslot) that is not in the first timeslot set. The alternative timeslot is the same as the alternative timeslot in step S205 shown in FIG. 2.

Optionally, the FlexE shim circuit 302 determines, depending on whether a quantity of error data blocks meets a condition, whether a timeslot is damaged. The method and condition for determining whether a timeslot is damaged are the same as those in step S203 shown in FIG. 2.

The media access controller 303, the FlexE shim circuit 302, and the physical layer transceiver 301 may be integrated into a field-programming logic gate array (FPGA) or an application-specific integrated circuit (ASIC), or may be disposed on different FPGAs or ASICs.

When the FlexE device 300 is used as the FlexE device A in the method shown in FIG. 2, an internal implementation of the FlexE device 300 is as follows:

The FlexE shim circuit 302 sends according to a first client calendar using the physical layer transceiver 301, data that includes a plurality of data blocks to the FlexE device B. The first client calendar indicates a correspondence between a client and a first timeslot set. The method for sending the data is the same as step S201 shown in FIG. 2.

The FlexE shim circuit 302 receives, using the physical layer transceiver 301, a timeslot damage notification in an overhead frame sent by the FlexE device B. The timeslot damage notification indicates that a first timeslot in the first timeslot set is damaged. The FlexE shim circuit 302 deletes, based on the timeslot damage notification, the relationship that is in the first client calendar and that is between the client and the first timeslot, to generate a second client calendar. The second client calendar indicates a correspondence between the client and a second timeslot set. The second timeslot set does not include the first timeslot. The second timeslot set may include any timeslot, other than the first timeslot, in the first timeslot set. The second timeslot set may further include a timeslot (for example, an alternative timeslot or a newly added timeslot) that is not in the first timeslot set. The method for generating, by the FlexE shim circuit 302, the second client calendar based on the timeslot damage notification is the same as step S205 shown in FIG. 2. The alternative timeslot is the same as the alternative timeslot in step S205 shown in FIG. 2.

The FlexE shim circuit 302 sends the second client calendar to the FlexE device B using the physical layer transceiver 301. The method for sending, by the FlexE shim circuit 302, the second client calendar is the same as step S205 shown in FIG. 2.

The FlexE shim circuit 302 sends data to the FlexE device B using the second client calendar and using the physical layer transceiver 301. The method for sending, by the FlexE shim circuit 302, the data to the FlexE device B using the second client calendar is the same as step S206 shown in FIG. 2.

The FlexE shim circuit 302 and the physical layer transceiver 301 may be integrated into an FPGA or an ASIC, or may be disposed on different FPGAs or ASICs.

Figure 4:
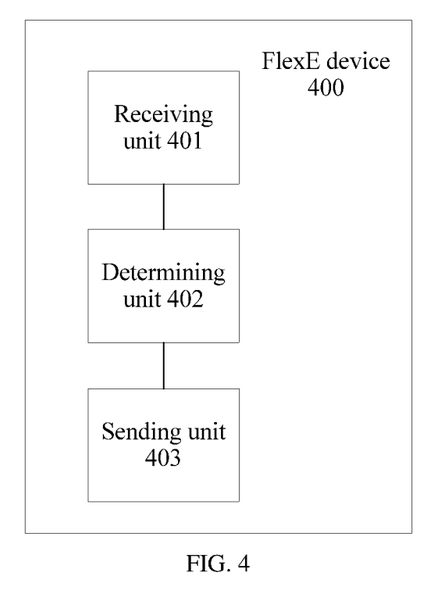
FIG. 4 is a structural diagram of a FlexE device 400 according to an embodiment of this application.

FIG. 4 is a structural diagram of a FlexE device 400 according to an embodiment of this application. The FlexE device 400 may be the FlexE device B in the method shown in FIG. 2, or may be the FlexE device 300 used as the FlexE device B in FIG. 3. The FlexE device 400 includes a receiving unit 401, a determining unit 402, and a sending unit 403. Functions of the receiving unit 401 and the sending unit 403 are implemented by, for example, the FlexE shim circuit 302 in combination with the physical layer transceiver 301 in FIG. 3. A function of the determining unit 402 is implemented by, for example, the FlexE shim circuit 302 in combination with the media access controller 303 in FIG. 3.

The receiving unit 401 is configured to receive according to a first client calendar, data that includes a plurality of data blocks and that is sent by a FlexE device A, where the first client calendar indicates a correspondence between a client and a first timeslot set.

The determining unit 402 is configured to determine, based on an error data block in the plurality of data blocks, that a first timeslot is damaged, where the first timeslot set includes the first timeslot.

The sending unit 403 is configured to add a timeslot damage notification to an overhead frame to be sent to the FlexE device A, where the timeslot damage notification indicates that the first timeslot is damaged.

The receiving unit 401 is further configured to receive a second client calendar sent by the FlexE device A, where the second client calendar indicates a correspondence between the client and a second timeslot set, and the second timeslot set includes a timeslot, other than the first timeslot, in the first timeslot set; and receive, using the second client calendar, the data sent by the FlexE device A.

Optionally, the second timeslot set further includes an alternative timeslot that is not in the first timeslot set.

Optionally, that the determining unit 402 determines, based on an error data block, that a first timeslot is damaged includes: if a quantity of error data blocks corresponding to the first timeslot meets a condition, the determining unit 402 determines that the first timeslot is damaged.

Figure 5:
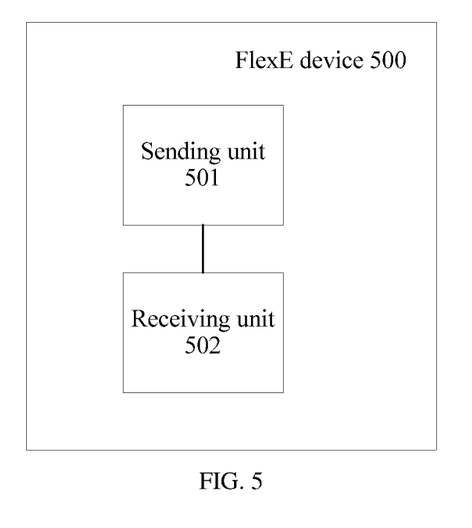
FIG. 5 is a structural diagram of a FlexE device 500 according to an embodiment of this application.

FIG. 5 is a structural diagram of a FlexE device 500 according to an embodiment of this application. The FlexE device 500 may be the FlexE device A in the method shown in FIG. 2 and the FlexE device 300 used as the FlexE device A in FIG. 3. The FlexE device 500 includes a sending unit 501 and a receiving unit 502. Functions of the sending unit 501 and the receiving unit 502 are implemented by, for example, the FlexE shim circuit 302 in combination with the physical layer transceiver 301 in FIG. 3.

The sending unit 501 is configured to send according to a first client calendar, data that includes a plurality of data blocks to a FlexE device B, where the first client calendar indicates a correspondence between a client and a first timeslot set.

The receiving unit 502 is configured to receive a timeslot damage notification in an overhead frame sent by the FlexE device B, where the timeslot damage notification indicates that a first timeslot in the first timeslot set is damaged.

The sending unit 501 is further configured to send a second client calendar to the FlexE device B, where the second client calendar indicates a correspondence between the client and a second timeslot set, and the second timeslot set includes a timeslot, other than the first timeslot, in the first timeslot set; and send data to the FlexE device B using the second client calendar.

Optionally, the second timeslot set further includes an alternative timeslot that is not in the first timeslot set.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to descriptions in the method embodiment.

It should be understood that sequence numbers of the foregoing method do not mean execution sequences in various embodiments of this application. The execution sequences of the method should be determined based on functions and internal logic of the processes, and should not be construed as any limitation on the implementation processes of the embodiments of this application.

A person of ordinary skill in the art may be aware that the circuits and method steps of the examples described with reference to the embodiments disclosed herein can be implemented using electronic hardware, computer software, or a combination thereof. To clearly describe interchangeability between the hardware and the software, the foregoing has generally described compositions and steps of the examples based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

What is claimed is:

1. A method implemented by a first network device for transmitting data, comprising:

receiving, from a second network device and according to a first client calendar, first data comprising a plurality of data blocks, wherein the first client calendar comprises a correspondence between a client and a first timeslot set, and wherein the first timeslot set comprises a first timeslot;

determining, based on an error data block in the data blocks, that the first timeslot is damaged when a quantity of error data blocks that correspond to the first timeslot meets a condition;

sending an overhead frame to the second network device, wherein the overhead frame indicates that the first timeslot is damaged;

receiving, from the second network device, a second client calendar, wherein the second client calendar comprises a correspondence between the client and a second timeslot set; and receiving, from the second network device, second data using the second client calendar.

2. The method of claim 1, further comprising deleting, based on the timeslot damage notification, a relationship between the client and the first timeslot from the first client calendar to generate the second client calendar.

3. The method of claim 1, wherein the second timeslot set comprises an alternative timeslot, and wherein the alternative timeslot is not in the first timeslot set.

4. The method of claim 3, further comprising replacing the first timeslot with the alternative timeslot.

5. A method implemented by a first network device for transmitting data, comprising:
sending, to a second network device according to a first client calendar, first data comprising a plurality of data blocks, wherein the first client calendar comprises a correspondence between a client and a first timeslot set, and wherein the first timeslot set comprises a first timeslot;
receiving, from the second network device, an overhead frame, wherein the overhead frame indicates that the first timeslot is damaged, and wherein the first timeslot is damaged when a quantity of error data blocks that correspond to the first timeslot meets a condition;
sending, to the second network device, a second client calendar, wherein the second client calendar comprises a correspondence between the client and a second timeslot set; and
sending, to the second network device, second data using the second client calendar.

6. The method of claim 5, further comprising deleting, based on the timeslot damage notification, a relationship between the client and the first timeslot from the first client calendar to generate the second client calendar.

7. The method of claim 5, wherein the second timeslot set comprises an alternative timeslot, and wherein the alternative timeslot is not in the first timeslot set.

8. The method of claim 7, further comprising replacing the first timeslot with the alternative timeslot.

9. A first network device, comprising:
a physical layer transceiver that:
receives, from a second network device and according to a first client calendar, first data comprising a plurality of data blocks, wherein the first client calendar comprises a correspondence between a client and a first timeslot set, and wherein the first timeslot set comprises a first timeslot; and
sends, to the second network device, an overhead frame, wherein the overhead frame indicates that the first timeslot is damaged;
a FlexE shim circuit coupled to the physical layer transceiver and that:
receives the first data from the physical layer transceiver; and
sends an overhead frame comprising the timeslot damage notification to the physical layer transceiver; and
a media access controller coupled to the FlexE shim circuit and the physical layer transceiver, wherein the media access controller:
determines an error data block in the data blocks; and
determines, based on the error data block, that the first timeslot is damaged when a quantity of error data blocks that correspond to the first timeslot meets a condition, wherein the physical layer transceiver further:
receives a second client calendar from the second network device, wherein the second client calendar comprises a correspondence between the client and a second timeslot set; and
receives, from the second network device, second data using the second client calendar,
wherein the FlexE shim circuit receives the second data from the physical layer transceiver.

10. The first network device of claim 9, wherein the second timeslot set comprises an alternative timeslot that is not in the first timeslot set.

11. A first network device, comprising:
a physical layer transceiver; and
a FlexE shim circuit coupled to the physical layer transceiver, wherein the FlexE shim circuit:
sends, to a second network device using the physical layer transceiver and according to a first client calendar, first data that comprises a plurality of data blocks, wherein the first client calendar comprises a correspondence between a client and a first timeslot set, and wherein the first timeslot set comprises a first timeslot;
receives, from the second network device using the physical layer transceiver, an overhead frame, wherein the overhead frame indicates that a first timeslot in the first timeslot set is damaged, and wherein the first timeslot is damaged when a quantity of error data blocks that correspond to the first timeslot meets a condition;
sends, to the second network device using the physical layer transceiver, a second client calendar, wherein the second client calendar comprises a correspondence between the client and a second timeslot set; and
sends, to the second network device using the physical layer transceiver, second data using the second client calendar.

12. The first network device of claim 11, wherein the FlexE shim circuit deletes, based on the timeslot damage notification, a relationship between the client and the first timeslot from the first client calendar to generate the second client calendar.

13. The first network device of claim 11, wherein the second timeslot set comprises an alternative timeslot that is not in the first timeslot set.

14. The first network device of claim 13, wherein the FlexE shim circuit replaces the first timeslot with the alternative timeslot.

15. The method of claim 1, wherein the condition is that the quantity of error data blocks that correspond to the first timeslot exceeds a threshold quantity of error data blocks.

16. The method of claim 5, wherein the condition is that the quantity of error data blocks that correspond to the first timeslot exceeds a threshold quantity of error data blocks.

17. The first network device of claim 11, wherein the condition is that the quantity of error data blocks that correspond to the first timeslot exceeds a threshold quantity of error data blocks.

18. The method of claim 1, wherein the condition is that the quantity of error data blocks that correspond to the first timeslot exceeds a threshold quantity of error data blocks within a unit time.

19. The method of claim 5, wherein the condition is that the quantity of error data blocks that correspond to the first timeslot exceeds a threshold quantity of error data blocks within a unit time.

20. The first network device of claim 11, wherein the condition is that the quantity of error data blocks that correspond to the first timeslot exceeds a threshold quantity of error data blocks within a unit time.

* * * * *